July 14, 1931.                    A. SIMONS                    1,813,968

NUT DEVICE

Filed April 19, 1930

INVENTOR
Abraham Simons
BY Mock & Blum
ATTORNEYS

Patented July 14, 1931

1,813,968

UNITED STATES PATENT OFFICE

ABRAHAM SIMONS, OF NEW YORK, N. Y.

NUT DEVICE

Application filed April 19, 1930. Serial No. 445,808.

My invention relates to a new and improved nut device.

One of the objects of my invention is to provide a new and improved nut device which preferably consists of a tapped portion, and of a second portion having a non-circular contour.

Another object of my invention is to provide a nut device having a portion of non-circular contour which can be connected to a correspondingly shaped opening in a sheet or plate, so that the nut device is non-turnably connected to said sheet or plate.

Another object of my invention is to provide a simple and cheap method of making a nut device which can be non-turnably connected to any suitable metal object.

Another object of my invention is to provide a nut device which is particularly useful for assembling portions of the bodies of automobiles, said nut device having a base portion which is provided with an internally threaded opening, said nut device also having a collar having a non-circular contour, said collar serving to connect the device to the wall of a correspondingly shaped opening in any metal plate, or the like.

Other objects of my invention will be set forth in the following description and drawings which illustrate a preferred embodiment of my invention, it being understood that the above general statement of the objects of my invention is intended merely to generally explain the same and not to limit it in any manner.

In order to assemble portions of the bodies of automobiles, by means of bolts, it is necessary to provide the parts with nut devices, and it is also necessary to prevent these nut devices from turning. It has been proposed to make these nut devices by a number of methods, but some of them have required the use of very expensive machinery, and it has been difficult to rigidly attach other devices of this type to a thin sheet of metal.

According to my invention, a nut device of this type can be simply and cheaply produced without the necessity of using special machinery, and this improved device has a thin collar of non-circular contour which can be readily bent over or expanded, to produce a firm rivet-like attachment.

Figure 3:
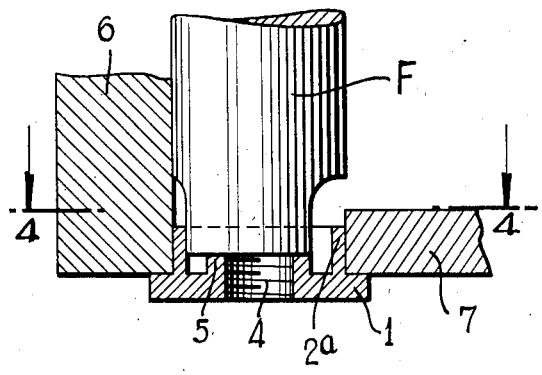
Fig. 3 is a diagrammatic view partially in section showing how the blank which is used for making the article, is held before the first operation is performed thereon.
Figure 5:
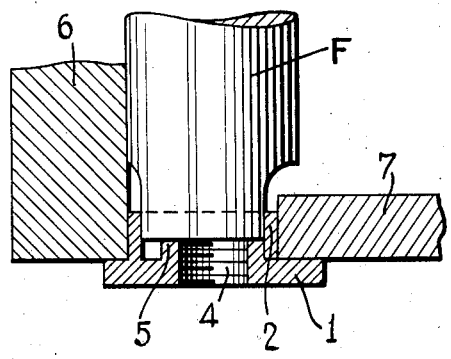
Fig. 5 is a view similar to Fig. 3 showing the completion of the article.

As shown in Fig. 3, the blank which is utilized for making the article has a base 1, provided with an opening 4 having a threaded wall. The base 1 is provided with a central boss 5, and it is also provided with a higher boss or collar 2a. The collar 2a is located intermediate the wall of the central opening 4, and the periphery of the base 1.

The blank can be made of any suitable material, such as cold rolled steel, brass, etc., which is tapped before or after it is shaped into final form. The entire blank can be made by means of screw machines.

The blank is supported upon any suitable base, so that the outer boss 2a contacts with an abutment 6, which has an inner contour which corresponds to that portion of the boss 2a which is to remain unflattened. A former F is then inserted within the collar 2a.

Figure 4:
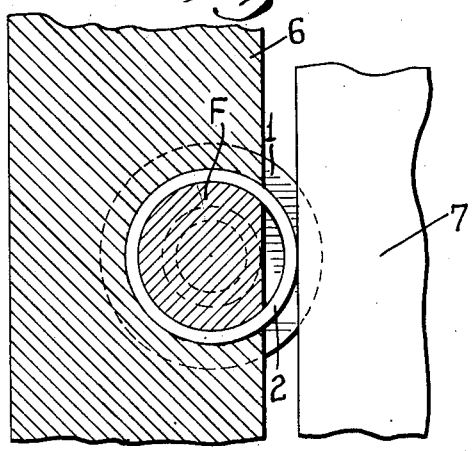
Fig. 4 is a sectional view on the line 4—4 of Fig. 3.
Figure 6:
Fig. 6 is a sectional view on the line 6—6 of Fig. 7.
Figure 7:
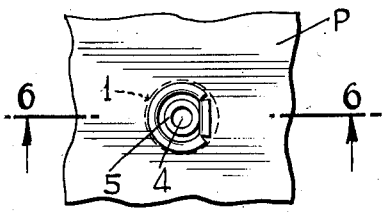
Fig. 7 shows how the nut device is applied to a sheet of metal.

As shown in Fig. 4, the bottom of the former F is of non-circular contour.

In the embodiment illustrated herein, the bottom of the former F is of D-shaped cross-section, but this cross section could be varied to any non-circular form.

For example, the bottom of this former F could be rectangular, or have any other desired polygonal form.

Figure 1:
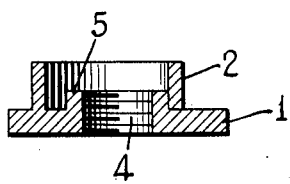
Fig. 1 is a section showing the completed article embodying my improvements.
Figure 2:
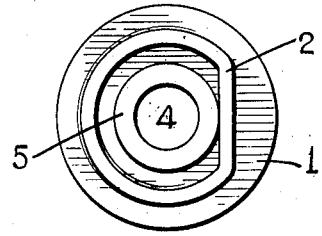
Fig. 2 is a top view.

A horizontally movable plunger 7 is then pushed against the boss or collar 2a. This causes the corresponding portion of the collar 2a to be flattened. A part of the base of this flattened portion may be slightly separated from the base 1, but experience has shown that the metal is drawn or sheared so that sufficient metal remains at the ends of the flattened wall portion, to avoid weakening the collar 2a too much. That is, experience has shown that when the collar 2a is pushed inwardly, the base of the flat wall portion which is thus formed, tends to separate more or less from the base 1. This flattened wall portion would therefore tend to tilt or bend inwardly. However, this is prevented by the boss 5, because this backs up the lower edge of the flat section of the collar and thus prevents the flat section of the collar from tilting or bending inwardly across the hole 4. The collar 2a of the blank is thus formed into the collar 2 of the completed article, shown in Figs. 1 and 4. This collar 2 is about 1/32nd of an inch thick, so that it can be readily bent over or expanded to form a rivet-like connection to a plate of sheet metal which is also about 1/32nd of an inch thick. It is impractical to tap a sheet of metal which is so thin. Hence the thin sheet of metal must have a threaded member connected thereto.

It will be noted that the collar 2a is of substantially equal thickness from top to bottom, and it is made so thin that it can be readily shaped.

A nut device is thus provided having a tapped base 1 of circular contour, and having a connecting collar of non-circular contour. The collar 2 is now inserted into an opening in a suitable plate or sheet P, made of any suitable metal, and the projecting portion of the collar 2 is then expanded so as to connect the parts in a rivet-like manner.

It is not necessary to heat the blank in order to shape it in the manner above shown.

I have shown one operation to provide the collar 2a with a flattened wall portion, but of course the collar 2a could be subjected to a plurality of such operations in order to form a plurality of flattened wall portions.

The collar is thus provided with a portion whose inner and outer walls are both flattened, the inner flattened wall abutting the boss 5. I do not wish to be limited to forming said walls with planar surfaces, because the idea is to transform the circular cross-section of the outer collar to a non-circular cross-section, by a radial pushing action.

The boss 5 may be eliminated without departing from the invention. However, I prefer to include the boss 5, because it serves as an abutment for the flattened wall portion of the outer collar, so that this flattened wall portion remains perpendicular to the base 1.

While it is not absolutely necessary to form the collar 2 with a flattened edge, this is desirable because it prevents the nut device from turning on the sheet of metal. It will be noted that the internal diameter of the collar 2 is greater than the diameter of the boss 5, and that at least a portion of the internal wall of the collar 2 abuts the outer wall of boss 5. Likewise, the flattened portion of collar 2 is formed by forcing its thin wall inwardly.

I have shown a preferred embodiment of my invention, but it is clear that numerous changes and omissions can be made without departing from its spirit.

I claim:

1. A nut device having a base provided with a tapped opening, said base having a boss surrounding said opening, said base having an upstanding collar of smaller diameter than the base, and of greater diameter than said boss, said collar having a flattened wall portion having a flattened inner face which substantially contacts with the adjacent exterior portion of said central boss.

2. A nut device having a base provided with a tapped opening, said base having a boss surrounding said opening, said base having an upstanding collar of smaller diameter than the base, and of greater diameter than said boss, said collar having an inwardly forced and flattened wall portion which substantially contacts with the adjacent exterior portion of said central boss, the outer wall of said boss being substantially parallel to the axis of said opening, so that said boss supports said flattened wall portion in a direction parallel to said axis.

3. A nut device having a base provided with a tapped opening, said base also having a collar, the internal wall of said collar being radially spaced from the wall of said opening, said collar having a portion whose inner and outer walls are flattened, said base having a substantially planar periphery, and the wall of said collar being yieldable so that said wall can be expanded in order to clamp an object against said periphery.

In testimony whereof I affix my signature.

ABRAHAM SIMONS.